United States Patent [19]

Briggs et al.

[11] 4,399,180
[45] Aug. 16, 1983

[54] COEXTRUDED THERMOPLASTIC STRETCH-WRAP

[75] Inventors: William F. Briggs, Chelmsford, Mass.; Edward M. Bullard, Rochester, N.Y.

[73] Assignee: Mobil Oil Corporation, New York, N.Y.

[21] Appl. No.: 373,079

[22] Filed: Apr. 29, 1982

Related U.S. Application Data

[63] Continuation of Ser. No. 187,678, Sep. 16, 1980, abandoned, which is a continuation-in-part of Ser. No. 942,715, Sep. 15, 1978, abandoned.

[51] Int. Cl.$^3$ .................... B32B 7/02; B32B 27/08
[52] U.S. Cl. ........................... 428/212; 428/213; 428/218; 428/516; 428/523; 428/911
[58] Field of Search ............... 264/45.5, 45.9, 176 R; 428/212, 215, 216, 217, 218, 523, 911, 516, 213, 515

[56] References Cited

U.S. PATENT DOCUMENTS

| | | | |
|---|---|---|---|
| 2,928,756 | 3/1960 | Campbell | 428/215 |
| 3,055,784 | 4/1962 | Roedel et al. | 154/50 |
| 3,201,302 | 8/1965 | Williams et al. | 161/252 |
| 3,294,577 | 12/1966 | Mayer et al. | 117/138.8 |
| 3,508,944 | 4/1970 | Henderson et al. | 117/7 |
| 3,783,089 | 1/1974 | Hurst et al. | 161/166 |
| 3,936,565 | 2/1976 | Good | 428/315 |
| 4,008,352 | 2/1977 | Dawes et al. | 428/474 |
| 4,022,646 | 5/1977 | Casey | 156/164 |
| 4,050,221 | 9/1977 | Lancaster et al. | 53/211 |
| 4,147,827 | 4/1979 | Breidt, Jr. et al. | 428/218 |
| 4,151,318 | 4/1979 | Marshall | 428/35 |
| 4,196,240 | 4/1980 | Lustig et al. | 428/35 |
| 4,197,150 | 4/1980 | Breidt, Jr. et al. | 156/229 |
| 4,205,021 | 5/1980 | Morita et al. | 525/240 |

FOREIGN PATENT DOCUMENTS

| | | | |
|---|---|---|---|
| 766727 | 9/1967 | Canada | 428/516 |
| 914411 | 1/1963 | United Kingdom | 428/516 |
| 1368634 | 9/1971 | United Kingdom | 428/516 |
| 1495380 | 1/1976 | United Kingdom | 428/516 |

OTHER PUBLICATIONS

"Polyethylene," *Modern Plastics Encyclopedia*, 1976–1977, pp. 65–73.

*Primary Examiner*—Bruce H. Hess
*Attorney, Agent, or Firm*—Charles A. Huggett; James F. Powers, Jr.; James P. O'Sullivan

[57] ABSTRACT

This present invention relates to novel coextruded thermoplastic film and the employment of such multi-layer film as stretch-wrap material for packaging of goods, including relatively large palletized loads of material. More specifically, such coextruded stretch-wrap films comprise three-layer laminations having a relatively thin skin layer and a relatively thicker core layer. Suitable skin layers include highly-branched low-density polyethylene, and suitable core layers include linear low-density polyethylene co-polymers, such as ethylene co-polymerized with a minor amount of at least one $C_4$ to $C_{10}$ alpha-olefin, such as octene-1 and 4-methyl-pentene-1, and butene-1.

4 Claims, No Drawings

COEXTRUDED THERMOPLASTIC STRETCH-WRAP

BACKGROUND OF THE INVENTION

This application is a continuation application of now abandoned application Ser. No. 187,678, filed Sept. 16, 1980, which in turn is a continuation-in-part application of now abandoned Ser. No. 942,715, filed Sept. 15, 1978.

The present invention relates to thermoplastic film structures, in particular plastic film structures which have been formed utilizing coextrusion techniques. The laminate comprises a core of a linear low-density polyethylene having exterior skin layers of low-density polyethylene, i.e., conventional polyethylene prepared utilizing the prior art free-radical high pressure polymerization process.

The use of thermoplastic stretch-wrap for the overwrap packaging of goods, in particular the unitizing of pallet loads, is a currently commercially developing end use application for thermoplastic films, including polyethylene. There are a variety of overwrapping techniques which are employed utilizing such stretch-wrap films, including locating the pallet load to be wrapped atop a rotating platform. As polyethylene film is laid on about the girth of the pallet load, the pallet load is rotated on its platform. The polyethylene stretch-wrap is applied from a continuous roll thereof. Braking tension is applied to the continuous roll of film so that the film is being continuously stretched by the rotating pallet load. Usually the stretch-wrap film located adjacent to the rotating pallet load is vertically positioned and the rotating platform or turntable may be operated at speeds ranging from about 5 up to about 50 revolutions per minute. At the completion of the overwrap operation the turntable is stopped completely while the film is cut and attached to the previous layer of film employing tack sealing, tape, spray adhesives or a cling-modified film whereby overlapping layers of the stretch-wrap have a pronounced tendency to cling together at their interface. Depending upon the width of the stretch film roll, the load being overwrapped may be shrouded in the film while the vertically positioned film roll remains fixed in a vertical position, or the vertically positioned film roll (e.g., in the case of relatively narrow film widths and relatively wider pallet loads) may be arranged to move in a vertical direction as the load is being overwrapped whereby a spiral wrapping effect is achieved on the packaged goods.

Stretch films employed in the prior art have included film materials such as polyethylene, polyvinyl chloride and ethylene vinyl acetate.

With respect of the ethylene vinyl acetate type of stretch film products, the prior art has employed a percentage by weight of vinyl acetate in the co-polymers of about 2% up to about 15% and preferably from about 4% up to about 12% by weight for stretch film applications.

Physical properties which are particularly significant for the successful use of thermoplastic films in stretch-wrap applications include their puncture resistance, their elongation characteristics, their toughness, and their resistance to tearing while under tension. In particular, the latter physical characteristics of such film, i.e., their resistance to tearing and their resistance to puncture, are particularly significant. In general tensile toughness is measured as an area under a stress-strain curve for a thermoplastic film, or it may be considered as the tensile energy absorbed, expressed in units of ft.-lbs./in.cu. to elongate a film to break under tensile load. In turn, this toughness characteristic is a function of the capacity of such films to elongate. The process of stretching the film decreases that capacity. Accordingly, the stretch-wrap process will decrease the toughness of the film while it is in its stretched condition as an overwrap as compared to unstretched counterparts, including such materials as shrink-wrap. Generally this loss of toughness is proportional to the amount of stretch imparted to the film as it is overwrapping a load of goods.

As hereinabove indicated, the resistance to tear characteristic of such films will be obviously an important physical characteristic for stretch-wrap applications since if the edge of the stretch film roll is nicked, abraded or in any way weakened before stretching or during the stretching operation, premature tearing of the film will usually occur during wrapping or subsequent handling of the load of goods.

In practice, one commonly accepted technique for properly tensioning a film around a load such as a pelletized load is to adjust the braking force on the roll unit a significant amount of neck-in (i.e., film width reduction) occurs. Alternatively film may be tensioned until an initiated tear results in unrestricted propagation of the tear across the film width.

It is an object of the present invention to provide a stretch film material which, unlike currently commercially available stretch films, is a laminar structure comprising at least two and preferably three film layers. The prior art stretch film materials hereinabove referred to, such as polyvinyl chloride, ethylene vinyl acetate copolymer and low-density polyethylene, have been found to offer reduced resistance to tear in both the film's machine direction and transverse direction as well as reduced toughness and elongation characteristics in contrast to the laminar film compositions of the present invention.

SUMMARY OF THE PRESENT INVENTION

In accordance with the present invention, a stretch-wrap material is provided which comprises a primary layer of a linear low-density polyethylene film, which primary layer has a coextruded layer on at least one side thereof comprising a highly branched low-density polyethylene fabricated utilizing a high pressure free-radical polymerization process. The preferred linear low-density polyethylenes consist essentially of ethylene copolymerized with minor amounts of another olefinic hydrocarbon having four to ten carbon atoms, including such materials as octene-1, 4-methyl-pentene-1, hexene-1, butene-1 and decene-1.

DESCRIPTION OF THE PREFERRED EMBODIMENTS

As hereinabove discussed, the present invention comprises the formation of a laminar stretch-wrap thermoplastic film by initially preparing the coextruded stretch-wrap product utilizing conventional coextrusion techniques. The material construction of the laminate prepared in accordance with the following example comprises a core layer of linear low-density polyethylene, the linear low-density material comprising ethylene which has been copolymerized with a minor amount of octene-1. Linear low-density ethylene copolymers are commercially available materials and are manufactured by low pressure processes employing stereospecific catalysts. These materials usually contain 1 to 10 wt.% of $C_4$ to $C_8$ α-olefin hydrocarbon copolymerized with ethylene, in sufficient amount to give 5 to 15 branches per thousand carbon atoms in the linear polymer. Manufacturing processes for linear low-density polyethylenes are disclosed in U.S. Pat. Nos. 4,076,698, and 4,205,021.

The exterior skin layers are fabricated from highly-branched low-density polyethylene resin produced by the high pressure process. The high pressure low-density polyethylene skin layer provides the requisite cling and gloss properties necessary for stretch film applications. The linear low-density polyethylene which contains the core layer imparts the desired tear and puncture resistance as well as the toughness which is required of a film in such a new use application.

In the following Table A the physical properties of the low-density polyethylene and the linear low-density polyethylene resins which were employed to fabricate the films identified as X-1, X-2 and X-3 reported in Table 2 are set forth below:

TABLE A

| LDPE-Skins (homopolymers) | LLDPE Core X-1 | LLDPE Core X-2 | LLDPE Core X-3 |
|---|---|---|---|
| Density (g/cc) | 0.9202 | 0.9228 | 0.9186 |
| Melt Index | 2.3 | 2.1 | 2.4 |
| Molecular Weight | | | |
| Wgt. Avg. | 99,100 | 96,300 | — |
| No. Avg. | 13,800 | 20,200 | — |

Also reported in Table 2 are the physical properties of a currently available LDPE laminar stretch film comprising two layers of high pressure (low-density) polyethylene. One layer had a density of 0.925 and a melt index of 1.4. The second layer had a density of 0.918 and a melt index of 7.0.

EXAMPLE 1

Linear low-density polyethylene as hereinabove defined was fed into the feed hopper of a conventional rotating screw extruder. The extruder screw employed has a 6" diameter and a length to diameter ratio of about 24:1. The satellite extruder which was employed for the extrusion of the hereinabove low-density polyethylene material comprised a conventional extruder having an extruder screw with a 3.5" diameter and a length to diameter ratio of about 24:1. Molten resin from the satellite extruder was fed into the cast film die affixed to the end of the core extruder, through an adapter specifically designed to join the polymer stream from the satellite extruder to the molten polymer core stream so that it covers and encompasses the molten surfaces of the core layer. A more complete description of this prior art process may be found in U.S. Pat. No. 3,748,962, the disclosure of which is incorporated herein by reference. The specific line conditions employed in the present example are set forth in the following table:

TABLE 1

| | SKIN RESIN | |
|---|---|---|
| | LDPE | LDPE |
| | | CORE RESIN |
| | LDPE | Ethylene-octene-1 |
| Melt Temperature | | |
| Skin (°F.) | 520 | 520 |
| Core (°F.) | 565 | 575 |
| Line Speed (FPM) | 715 | 635 |
| Chill Roll Temperature (°F.) | 75 | 75 |
| Extruder Screw Speed (RPM) | | |
| Satellite | 65 | 65 |
| Main | 110 | 85 |
| Skin Percentage % by wgt. | 15 | 15 |
| Gauge of Laminate (mils) | 1.0 | 1.0 |
| % Octene-1 by Wgt. | | 12% |

Although the present example describes a cast film process for the manufacture of the present stretch film products, it will be understood that other conventional thermoplastic film forming techniques may be employed, such as the commonly employed tubular extrusion process utilizing an entrapped air bubble to expand the extruded film tube. The film produced in accordance with the present example comprises a linear low-density polyethylene core consisting of about 85% by weight of the over-all laminar product, while the exterior high pressure low-density polyethylene skins contributed about 7½% by weight per side. The gauge of the composite laminar structure ranged from about 0.8 up to about 1.0 mil.

The physical properties of film produced in accordance with Example 1 and identified in the following Table 2 as X-1, X-2, and X-3 are set forth below. Additionally, in Table 2, for comparative purposes, the physical properties of currently commercially available stretch-wrap materials, including polyvinyl chloride, ethylene vinyl acetate, and a two layer low-density polyethylene are set forth.

TABLE 2

| | | Ethylene-α-olefin Coextrusion | | | | | |
|---|---|---|---|---|---|---|---|
| | | X-1 | X-2 | X-3 | PVC | EVA | LDPE |
| Caliper (mils) | | 1.0 | 1.1 | 0.93 | 0.8 | 1.0 | 1.0 |
| ASTM D-882 | | | | | | | |
| Ultimate Tensile PSI | MD | 4200 | 5400 | 6542 | 4900 | 5400 | 3600 |
| | TD | 3300 | 3700 | 4459 | 4000 | 4500 | 2300 |
| Yield (PSI) | MD | 1900 | 1300 | 958 | 1600 | 900 | 1300 |
| | TD | 1100 | 1300 | 963 | 1000 | 800 | 1300 |
| Elongation (%) | MD | 500 | 650 | 597 | 300 | 450 | 500 |
| | TD | 900 | 900 | 907 | 300 | 600 | 700 |
| ASTM D-1922 | | | | | | | |
| Elmendorf Tear - g/mil | MD | 150 | 90 | 130 | 80 | 35 | 150 |
| | TD | 700 | 960 | 798 | 120 | 75 | 350 |
| ASTM D-882 | | | | | | | |
| Toughness (Ft. lbs/in$^3$) | MD | 1100 | 1500 | 1670 | 800 | 1300 | 1050 |
| Puncture | | | | | | | |
| Instron Penetration | Lbs. | 10 | 11 | 9.5 | 12 | 15 | 8 |
| Energy | | | | | | | |
| Rupture Penetration | In.-Lbs | 36 | 37 | 39.9 | 19 | 44 | 12 |

TABLE 2-continued

| | | Ethylene-α-olefin Coextrusion | | | | | |
|---|---|---|---|---|---|---|---|
| | | X-1 | X-2 | X-3 | PVC | EVA | LDPE |
| Instron Probe | In. | 5 | 5 | 6.2 | 3 | 5 | 3 |
| Cling Index | | — | 1.0 | 2.4 | 2.3 | 3.5 | 2.2 |
| ASTM D-2457 | | | | | | | |
| (Gloss (% at 45°) | | 87 | 85 | 89.9 | 87 | 74 | 89 |
| ASTM D-1003 | | | | | | | |
| Haze (%) | | 1.5 | 2.2 | 0.8 | 1 | 2 | 1 |
| Density (g/cc) | | 0.9151 | 0.9174 | — | 1.23 | 0.9313 | 0.9185 |

It has been found that the types of high pressure, low-density skin resins employed in the present invention may vary in physical characteristics. Preferred skin resins however include those with densities of from about 0.917 up to about 0.922 and melt indices of from about 4 up to about 8. The preferred linear low density polyethylene co-polymer core resins include those with densities of from about 0.916 up to about 0.925 with melt indices of from about 1.0 up to about 6.0. The thicknesses of the skin layers may vary widely, however preferred thicknesses include those from about 5% up to about 40% based upon the overall thickness of the laminate.

It is to be understood that the foregoing description is merely illustrative of preferred embodiments of the invention, of which many variations may be made by those skilled in the art within the scope of the following claims without departing from the spirit thereof.

What is claimed is:

1. A thermoplastic film adapted for use as a stretch film wrap comprising a coextruded three-layer thermoplastic film having a core layer comprising a linear low-density polyethylene, said linear low-density polyethylene consisting essentially of ethylene co-polymerized with a minor amount of at least one alpha-olefin having four to ten carbon atoms and exterior skin layers comprising highly-branched low-density polyethylene.

2. A film according to claim 1 wherein said core layer consists essentially of linear low-density copolymer of ethylene with a minor amount of octene-1, having a density of about 0.916 to 0.925 and a melt index of about 1.0 to 6.0.

3. A film according to claim 1 wherein said linear low-density polyethylene contains about 1 to 10 weight % total of butene-1, 4-methyl pentene-1, octene-1 or mixtures thereof.

4. A film according to claim 1 wherein said core layer has a density of about 0.916 to about 0.925 and a melt index of about 1.0 to about 6.0 and said skin layers have a density of about 0.917 to about 0.922 and a melt index of about 4 to about 8.

* * * * *